United States Patent
Arbesman et al.

(10) Patent No.: US 9,360,067 B1
(45) Date of Patent: Jun. 7, 2016

(54) HYBRID LAMINATE

(71) Applicant: Ray Arbesman, Toronto (CA)

(72) Inventors: Ray Arbesman, Toronto (CA); Winston MacKelvie, Knowlton (CA)

(73) Assignee: R. A. Investment Management S.A.R.L., Luxembourg (*) Notice: Subject to any disclaimer, the term of this patent is extended or adjusted under 35 U.S.C. 154(b) by 0 days.

(21) Appl. No.: 14/615,310

(22) Filed: Feb. 5, 2015

(51) Int. Cl.
  *F16D 69/04* (2006.01)
  *F16D 65/092* (2006.01)
  *F16D 69/00* (2006.01)

(52) U.S. Cl.
  CPC .............. *F16D 65/092* (2013.01); *F16D 69/04* (2013.01); *F16D 2069/005* (2013.01); *F16D 2069/0441* (2013.01); *F16D 2069/0466* (2013.01); *F16D 2069/0491* (2013.01)

(58) Field of Classification Search
  CPC ............ F16D 65/095; F16D 2069/005; F16D 2069/008; F16D 2069/0441; F16D 2069/0466; F16D 69/0408; F16D 69/04
  See application file for complete search history.

(56) References Cited

U.S. PATENT DOCUMENTS

| | | | |
|---|---|---|---|
| 1,897,088 A | 2/1933 | Victor | |
| 1,915,221 A | 6/1933 | Fitzgerald | |
| 2,171,530 A | 9/1939 | Balfe | |
| 2,255,268 A | 9/1941 | Perrine | |
| 3,092,532 A | 6/1963 | Swick et al. | |
| 3,170,354 A | 2/1965 | Scholl | |
| 3,513,950 A | 5/1970 | Ratcliffe et al. | |
| 3,533,891 A | 10/1970 | Puyear | |
| 3,551,232 A | 12/1970 | Thompson | |
| 3,557,407 A | 1/1971 | Lemelson | |
| 3,605,360 A | 9/1971 | Lindal | |
| 3,615,994 A | 10/1971 | MacLaine et al. | |
| 4,023,613 A | 5/1977 | Uebayasi et al. | |
| 4,234,638 A | 11/1980 | Yamazoe et al. | |
| 4,552,252 A | 11/1985 | Stahl | |
| 4,569,424 A | 2/1986 | Taylor, Jr. | |
| 4,640,390 A | 2/1987 | Saumweber et al. | |
| 4,705,278 A | 11/1987 | Locacius et al. | |
| 4,723,783 A | 2/1988 | Belter et al. | |
| 4,776,602 A | 10/1988 | Gallo | |

(Continued)

FOREIGN PATENT DOCUMENTS

| CA | 1330521 C | 10/1988 |
|---|---|---|
| CA | 1337622 C | 3/1989 |

(Continued)

OTHER PUBLICATIONS

U.S. Appl. No. 14/532,739, filed Nov. 4, 2014 entitled "Precursor Laminate and Method for Forming a Laminate".

(Continued)

*Primary Examiner* — Anna Momper
(74) *Attorney, Agent, or Firm* — Kilpatrick Townsend & Stockton LLP

(57) ABSTRACT

A method of making a hybrid laminate whereby a first, thick base lamina has a plurality of piercing members or barbs and a second, onto which a second, thin interface lamina is impaled. The exposed tips of the barbs are clinched over to form rivet-like heads that clamp the two laminae together. By choosing the materials for the lamina, an interface surface can be provided for a wide range of other materials or objects to be attached by, for example, adhesive bonding. A disc brake pad is disclosed made from the instant hybrid laminate.

16 Claims, 2 Drawing Sheets

(56) References Cited

U.S. PATENT DOCUMENTS

| | | | |
|---|---|---|---|
| 4,781,389 A | | 11/1988 | Beyer et al. |
| 4,799,579 A | * | 1/1989 | Myers et al. ............. 192/107 M |
| 4,815,172 A | | 3/1989 | Ward |
| 4,911,972 A | | 3/1990 | Mercuri |
| 4,939,818 A | | 7/1990 | Hahn |
| 5,067,210 A | | 11/1991 | Keyaki |
| 5,142,743 A | | 9/1992 | Hahn |
| 5,143,184 A | | 9/1992 | Snyder et al. |
| 5,172,920 A | | 12/1992 | Schlenk |
| 5,261,512 A | * | 11/1993 | Young ....................... 188/250 B |
| 5,362,074 A | | 11/1994 | Gallo et al. |
| 5,376,410 A | | 12/1994 | MacKelvie |
| 5,413,194 A | | 5/1995 | Kulis, Jr. et al. |
| 5,469,604 A | | 11/1995 | Calmettes et al. |
| D374,609 S | | 10/1996 | Akeno |
| D376,533 S | | 12/1996 | Akeno |
| 5,585,166 A | * | 12/1996 | Kearsey ........................ 428/212 |
| 5,611,122 A | | 3/1997 | Torigoe et al. |
| 5,732,800 A | | 3/1998 | Spigener |
| 5,788,247 A | | 8/1998 | Tensor |
| D400,427 S | | 11/1998 | Okawa et al. |
| 5,842,546 A | | 12/1998 | Biswas |
| 6,022,502 A | | 2/2000 | Lockhart et al. |
| D425,405 S | | 5/2000 | Naohara et al. |
| 6,247,704 B1 | | 6/2001 | Battistoni |
| 6,258,457 B1 | | 7/2001 | Ottinger et al. |
| 6,276,045 B1 | | 8/2001 | Buchi et al. |
| 6,279,222 B1 | | 8/2001 | Bunker et al. |
| 6,431,331 B1 | | 8/2002 | Arbesman |
| 6,464,047 B1 | | 10/2002 | Arbesman |
| 6,622,346 B2 | | 9/2003 | Graham et al. |
| 6,671,935 B2 | | 1/2004 | Filion et al. |
| 6,843,095 B2 | | 1/2005 | Arbesman |
| 6,860,368 B2 | | 3/2005 | Kulis, Jr. et al. |
| 6,910,255 B2 | | 6/2005 | Arbesman |
| 6,913,673 B2 | | 7/2005 | Baggot et al. |
| 7,048,097 B2 | | 5/2006 | Arbesman |
| 7,222,701 B2 | | 5/2007 | Pham |
| 7,320,386 B2 | | 1/2008 | Kulis, Jr. et al. |
| 7,686,142 B2 | | 3/2010 | Jung |
| 7,841,052 B2 | | 11/2010 | Ducauchuis |
| 7,989,049 B2 | | 8/2011 | Potier |
| 8,048,507 B2 | | 11/2011 | Townsend et al. |
| 8,088,316 B2 | | 1/2012 | Muth et al. |
| D654,355 S | | 2/2012 | Cheng |
| 8,407,864 B2 | | 4/2013 | Mask et al. |
| 8,683,840 B2 | | 4/2014 | Tuma et al. |
| 8,685,520 B2 | | 4/2014 | Meyer et al. |
| 2002/0170789 A1 | | 11/2002 | Poelemans |
| 2003/0127291 A1 | | 7/2003 | Wood et al. |
| 2004/0016608 A1 | * | 1/2004 | Gutowski ..................... 188/73.1 |
| 2004/0099493 A1 | | 5/2004 | Himmelsbach et al. |
| 2004/0140165 A1 | | 7/2004 | Pham |
| 2004/0182672 A1 | | 9/2004 | Hartner et al. |
| 2005/0170157 A1 | | 8/2005 | Armela et al. |
| 2006/0027427 A1 | | 2/2006 | Anda et al. |
| 2006/0093802 A1 | | 5/2006 | Tsai et al. |
| 2006/0246256 A1 | | 11/2006 | Ausen et al. |
| 2006/0260881 A1 | | 11/2006 | Henley et al. |
| 2008/0003401 A1 | | 1/2008 | Barnes et al. |
| 2009/0223753 A1 | | 9/2009 | Kappagantu et al. |
| 2010/0170758 A1 | | 7/2010 | Chen |
| 2010/0207334 A1 | | 8/2010 | Virgin et al. |
| 2011/0051724 A1 | | 3/2011 | Scott et al. |
| 2011/0079065 A1 | | 4/2011 | Cabanski et al. |
| 2011/0233875 A1 | | 9/2011 | Shaver et al. |
| 2011/0260371 A1 | | 10/2011 | Arora et al. |
| 2012/0003462 A1 | | 1/2012 | Wong |
| 2012/0006959 A1 | | 1/2012 | Braun et al. |
| 2013/0152654 A1 | | 6/2013 | Arbesman et al. |
| 2013/0175127 A1 | * | 7/2013 | MacKelvie ............... 188/250 B |
| 2015/0053517 A1 | | 2/2015 | Arbesman et al. |
| 2015/0086750 A1 | | 3/2015 | Arbesman et al. |
| 2015/0099093 A1 | | 4/2015 | Arbesman et al. |

FOREIGN PATENT DOCUMENTS

| | | |
|---|---|---|
| CA | 2127339 A1 | 7/1994 |
| CA | 2272115 A1 | 11/1999 |
| CA | 2391183 | 12/2003 |
| CA | 2778455 A1 | 11/2013 |
| CA | 2780397 A1 | 12/2013 |
| CA | 2798303 A1 | 6/2014 |
| DE | 19754740 A1 | 3/1999 |
| DE | 102004048464 | 4/2006 |
| DE | 102006015100 | 10/2007 |
| DE | 102006015145 | 10/2007 |
| DE | 102006015148 | 10/2007 |
| EP | 0859163 | 8/1998 |
| EP | 0859163 A1 | 8/1998 |
| EP | 0934820 | 8/1999 |
| GB | 2125126 | 2/1984 |
| GB | 2507128 A | 4/2014 |
| WO | 2011051724 | 5/2011 |
| WO | 2013177667 | 12/2013 |
| WO | 2015010183 A1 | 1/2015 |

OTHER PUBLICATIONS

U.S. Appl. No. 14/533,218, filed Nov. 5, 2014 entitled "Wood-Steel Composite Structure".

Tanged Metal Reinforced Graphite Gasket data sheet, Ningbo Sunwell Fluid Technologies Co., Ltd., 2010.

TangedGraphite datasheet, Alba Gaskets.

Graphite Sheet with Tanged Metal, Cixi CAZseal Packing & Gasket Co. Ltd.

Supagraf Expanded Graphite Jointings datasheet.

SLT-20 Tang Sheet Specification, Dynoteq Kft.

Gee Graphite Data Sheet, Tanged Stainless Steel Reinforced Graphite Sheet, Gee Graphite.

Specification Sheet: SPG7003, SPG Gaskets Co.

Graphite Sheet Gaskets, Environmental Gasket Company Ltd.

* cited by examiner

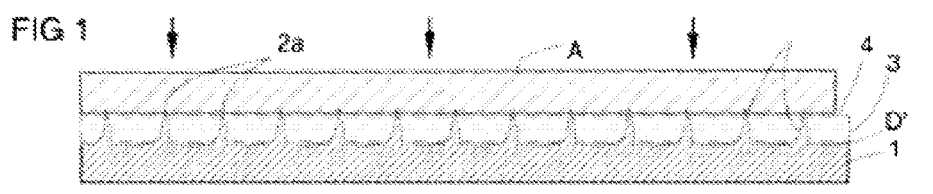
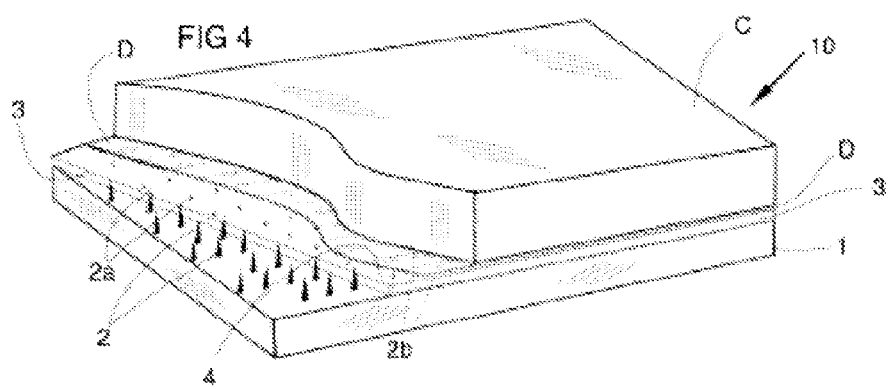

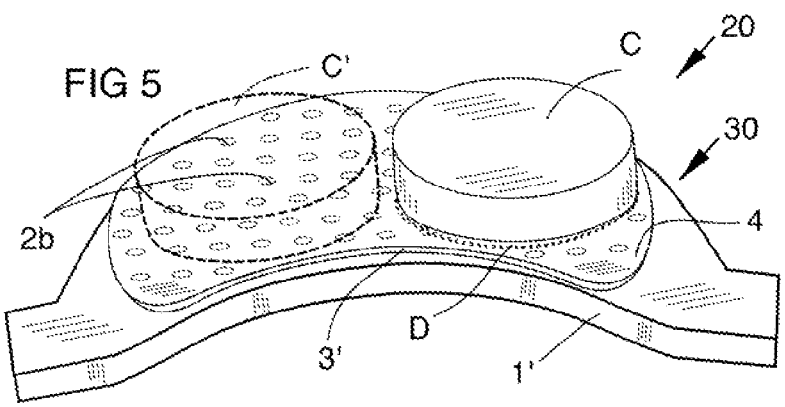
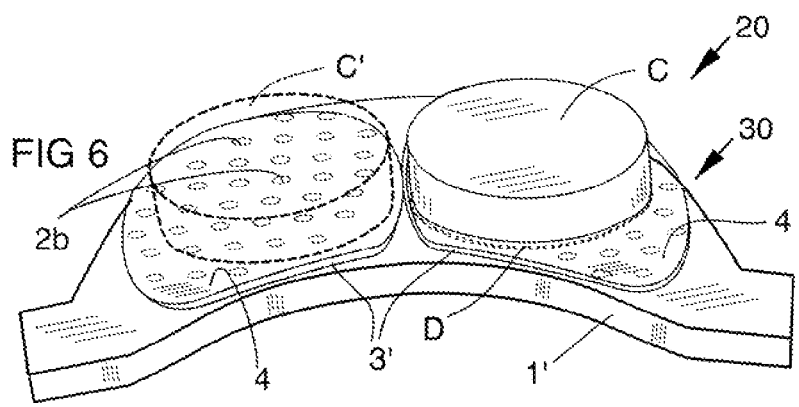
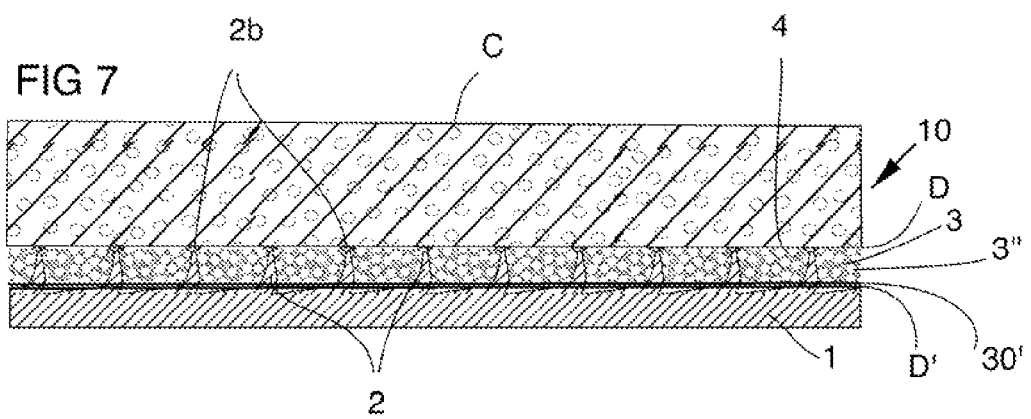

HYBRID LAMINATE

FIELD OF THE INVENTION

The present invention relates generally to lamination of sheets and plates of dissimilar materials and more particularly to the use of such laminates for the manufacture of disc brake pads.

BACKGROUND OF THE INVENTION

Laminates are generally made from thin laminae of the same or similar material stacked together with adhesive between the laminae. They are then pressed and heated until cured into a one-piece, sheet-like laminate.

Disc brake pads are generally made by adhering friction material to a steel backing plate. This is done using a "batch" process where a measure of powered friction material is poured directly onto each backing plate in moulds specific for each model and year of vehicle. The moulds are then stacked and compressed under high heat until the friction material cures. It follows that brake pad production (and therefore cost) is constrained by the number of moulds, the capacity of the presses and the time for the friction material to cure or harden. Considering that each car, each model and each year can have a different brake pad configuration, the process is expensive and inefficient. This requires the use of many moulds and heat presses, and is expensive, but is the usual method used to attach friction material to backing plates to form brake pads.

It would be very desirable to be able to pre-manufacture cured friction material and simply attach it to the backing plate, however, with prior art steel backing plates this cannot be done in a way that provides sufficiently strong bond between the friction material and the plate.

SUMMARY OF THE INVENTION

The present invention provides a hybrid laminate disc brake backing plate including a base lamina and an interface lamina. The base lamina is a metal plate having a surface with piercing members extending from it. Each piercing member extends from the surface and initially has a pointed distal end. The interface lamina is impaled on the piercing members so that the piercing members extend through the interface lamina. Then the distal ends of the piercing members are clinched to lock the base lamina and interface lamina together. The interface lamina is made from a material that is pierceable by the piercing members and which is adhesively bondable to cured friction material.

The base lamina is preferably made of steel.

The material of the interface lamina and the adhesive are preferably selected so that the adhesive bonds cured friction material to the hybrid laminate disc brake backing plate sufficiently strongly for normal use in a vehicle disc brake system.

The surface of the base lamina may have multiple patches of piercing members extending from it, in which case the interface lamina then has multiple separate portions, each portion corresponding to one of the patches of piercing members. In such embodiments, each portion of the interface lamina is impaled on one of the patches of piercing members. The patches of piercing members may be spaced apart to permit air flow between friction pucks attached to the interface lamina.

The invention also provides a disc brake pad formed from the hybrid laminate disc brake backing plate described above and at least one puck of friction material. Each puck of friction material is adhesively bonded to the interface lamina. The friction pucks may be bonded to the interface lamina by a thermoplastic or thermoset resin.

The interface lamina may be made of abrasive filled resin-reinforced fibre.

The interface lamina may be a coated abrasive comprising a sheet with a layer of adhesively-bound grains dispersed on it. The grains may be sand, aluminum oxide, silicon carbide, garnet, or emery.

The invention also provides a hybrid laminate for adhering to an attachment, where the laminate has a base lamina and an interface lamina. The base lamina is a surface with piercing members extending from it. Each piercing member extends from the surface and initially has a pointed distal end. The interface lamina is impaled on the piercing members so that the piercing members extend through the interface lamina, and the distal ends of the piercing members are clinched to lock the base lamina and interface lamina together. The interface lamina is made from a material that is selected to be pierceable by the piercing members and which is adhesively bondable to the attachment. The base lamina is preferably made of steel. A functional material different from the materials used to form the base lamina and the interface lamina may be disposed between the base lamina and the interface lamina. The functional material may be a sealant.

The invention also provides a hybrid laminate disc brake backing plate having a base lamina and an interface lamina, where the base lamina is a metal plate having a surface with piercing members having clinched heads extending from it. The piercing members pass through the interface lamina, and the clinched heads lock the base lamina and interface lamina together. The interface lamina is made from a material that is adhesively bondable to cured friction material.

The invention also provides a method of making a hybrid laminate for adhering to an attachment. The method employs a base lamina having a surface with piercing members extending from it, each piercing member extending from the surface and having a pointed distal end. It also employs an interface lamina made from a material that is selected to be pierceable by the piercing members and that is adhesively bondable to the attachment. The method involves first positioning the interface lamina above the piercing members and then impaling the interface lamina onto the piercing members by using a pressure pad to press the interface lamina down onto the piercing members so that the distal ends of the piercing members extend through the interface lamina and into the pressure pad. Then the pressure pad is removed and the distal ends of the piercing members are clinched to clamp and secure the base lamina and interface lamina together. The clinching of the distal ends of the piercing members may be done by pressing a hard plate down on the distal ends of the piercing members. The clinching of the distal ends of the piercing members may be done by rolling a roller over the distal ends of the piercing members extending through the interface lamina. The pressure pad may be made from an elastomer. The attachment may be a puck of brake friction material, and the base lamina may be made of steel, and the hybrid laminate configured to be a disc brake backing plate. The method may further include a step of adhering one or more pucks of friction material to the interface lamina to produce a braking pad.

The invention also provides another method of making a hybrid laminate for adhering to an attachment. The method employs a base lamina having a surface with piercing members extending from it, each piercing member extending from the surface and having a pointed distal end. It also employs an interface lamina made from a material that is selected to be pierceable by the piercing members and that is adhesively bondable to the attachment. The method involves first positioning the interface lamina above the piercing members and impaling the interface lamina onto the piercing members by using a hard pressure pad to press the interface lamina down onto the piercing members so that the distal ends of the piercing members extend through the interface lamina and are then clinched by the pressure pad as the interface lamina is pressed against the surface of the base lamina. The clinching of the distal ends of the piercing members locks the interface lamina to the base lamina.

BRIEF DESCRIPTION OF THE DRAWINGS

FIG. 1 is a side cross-sectional view of a laminate, showing a barbed base lamina below an interface lamina that has been impaled thereon by a penetrable pressure pad above and having an optional non-lamina material between the laminae with functional properties, such as sealing.

FIG. 2 is a side cross-sectional view of the laminate of FIG. 1, where the exposed barb tips have been headed (clinched or bent) over onto the interface surface of the interface lamina by the use of the hard (barb-impenetrable) pad above.

FIG. 3 is a side cross-sectional view of the laminate of FIG. 1, with the addition of a purposeful lamina (an "attachment") that has been adhesively bonded to the interface surface of the interface lamina.

FIG. 4 is a perspective fragmentary view of a hybrid laminate according to the instant invention showing a base lamina and an interface lamina. A purposeful outer layer or lamina is bonded thereto. The original barbs are shown with pointed, piercing tips onto which the interface lamina has been impaled, and a hard plate has headed the protruding tips down onto the interface surface.

FIG. 5 is a perspective view of a disc brake pad made using the instant invention where the brake friction material comprises two cylindrical pucks (one in dotted outline) that are adhesively bonded to a single piece of an interface lamina.

FIG. 6 is a perspective view of the disc brake pad of FIG. 5, where the interface layer is in two pieces located over two areas ("patches") from which the barbs extend.

FIG. 7 shows a side view of a brake pad employing a preferred embodiment of a hybrid laminate.

DETAILED DESCRIPTION

In the instant invention a hybrid laminate is made from two laminae made from different materials that are joined mechanically.

The hybrid laminate preferably has two laminae or layers: a thicker base lamina having pointed piercing members ("barbs") rising from the surface; and at least one thinner interface lamina impaled or applied onto the barbs such that the tips of the barbs protrude above the interface lamina. As used herein, "barb" and "piercing member" describe any type of nail-like or pin-like structure, or hooked structure, raised from the surface of a material by carving, gouging, planing or scraping its surface, such as is described in Canadian patent numbers 1,330,521, 1,337,622, and 2,127,339 and in Canadian patent application number 2,778,455, all of which are hereby incorporated herein by reference in their entirety. The use of such textured materials to form laminates is described in Canadian patent application numbers 2,778,455, 2,821,897 and 2,855,378, and U.S. patent application Ser. Nos. 14/532,739 and 14/533,218, all of which are hereby incorporated herein by reference in their entirety.

The barbs may extend across the entire surface of the base lamina or be located in two (or more) separate localized patches. The interface lamina can be one piece or may comprise multiple shaped pieces to match the locations and areas corresponding to patches of barbs, if the barbs are in patches, each piece being sized and shaped (as are the patches of barbs) to be adhered to a particular attachment (such as a puck of friction material of a particular size and shape).

The two laminae may be assembled using a barb-penetrable pressure pad made of a suitable material such as an elastomer, wood, soft plastic or the like, to press the interface lamina down onto the barbs. A suitable pressure pad will allow the barbs' tips to penetrate the pressure pad as the interface lamina descends against the base lamina and the barb tips pierce through the upper surface of the interface lamina. By exerting sufficient pressure, the bottom of the interface lamina is pushed down against the substantially flat surface of the base lamina from which the barbs extend, and the pointed tips ("distal ends") of the barbs extend through the interface laminate, out of (protruding from) the upper surface of the interface laminate, and into the pressure pad.

It is preferred that each barb extends substantially perpendicularly from the substantially flat surface of the base lamina to facilitate the impaling of interface lamina on the base lamina. However, in some cases, some or all of the barbs may not be perpendicular to the surface.

The barb tips are then headed (bent over or clinched) by means of a hard plate or roller to effectively clamp and secure the two laminae together. There may be included an adhesive, sealer, coating, plating, inhibitor, or the like between laminae.

Of course, in some combinations of lamina properties, the pressure pad for pressing could be a barb-impenetrable pad such as the same hard pad used for heading, so that the interface lamina is pressed down onto the barbs, and all the tips are headed (or "clinched") in one pressing operation.

A wide range of materials may be selected for the two laminae based on relative hardness of the laminae and on the final use. For example, barbs on an aluminum or copper base lamina are softer than those of steel and so may not be able to penetrate an interface lamina that is too hard.

In this way, the instant hybrid laminate may be configured to provide a select interface surface that is very well suited for the attachment of other laminae, objects, sheets or plates formed from a wide range of materials. In this way, the instant hybrid laminate overcomes certain limitations in joining dissimilar materials together found in the prior art. For example, thermal expansion differences can be mitigated by choosing a material for the interface lamina with intermediate thermal properties (intermediate between the thermal properties of the base lamina and the attachment to be adhered to the laminate).

Likewise the interface lamina can be chosen to have ideal adhesive properties, such as being fibrous or porous and the like, so that objects or outer layers ("attachments") can be securely bonded to the interface lamina, even when the base lamina is, for example, hard steel that would not adhesively bond well to the attachment. In a disc brake back plate application, the interface lamina material is selected to be a material that is pierceable by the piercing members and which is well suited for adhesive bonding to friction material used in disc brake systems. Such materials are well known to skilled persons. Herein, the phrase X being "adhesively bondable" to Y in a particular article means that X and Y may be securely bonded by known adhesives normally used in such or similar articles, such that the bond is sufficiently strong that the article will perform in a commercially acceptable manner. For example, in a disc brake bad, the bond of a puck of friction material is "adhesively bondable" to an interface lamina if the bond is sufficiently strong for use in a vehicle disc brake system. In such use, the puck is subject, during normal use, to enormous shear forces, so, for example, a puck of friction material is clearly not adhesively bondable directly to a metal (e.g. steel) backing plate. This fact is a key motivation for the instant invention. Pucks of friction material are adhesively bondable to a range of materials that may be used to form interface laminae, and such materials (and adhesives) are known to skilled persons.

In the case of a disc brake pad, the instant hybrid lamination offers multiple benefits. Using a typical steel backing plate as the base lamina, an interface lamina can be chosen having ideal adhesive bonding properties. Then, the wearable brake friction material "puck" that has been pre-formed can be bonded thereto.

Uncommon friction puck shapes such as a circular, rectangular, trapezoidal or polygonal shapes become possible (referring to the horizontal cross-sectional shape, so that, for example, a "circular" puck is a disc, e.g. like item C in FIGS. 5 and 6). The upper and lower surfaces of a puck are generally flat, the upper face being designed to contact and apply frictional force to one side of a disc brake rotor, and the lower face being designed to be adhered to the upper surface of the interface lamina, which is generally flat. These can be arranged in numerous ways with space between pucks. This, in turn, as is well known, makes for superior cooling of the friction pad resulting in safer brake pads that are longer lasting and less subject to brake fade.

Furthermore, the arrangement of the present laminate allows for lower cost of production since friction pucks can be "cookie cut" to a few standard diameters, cured off-site, and then delivered ready for assembly with a hybrid laminate backing plate. In this way a "continuous" brake manufacturing process can be used with distinct speed and cost advantages over the prior art "batch" manufacturing process.

Barbs can be added to ductile materials by using a press with tooling that has a set of blades each with multiple teeth. The blades are made to travel oppositely across a material's surface to plough (plow), broach or plane, short shallow grooves ("stop grooves") that are non-piercing. The material from the grooves is displaced upwards in the form of sharp, pointed piercing members or "barbs", which are firmly attached to the "stop" end of each groove. The barbs can extend over an entire surface or in patches in different locations spaced apart on the surface.

In FIG. 1 the base lamina 1 (or just "base") has barbs 2 with barb tips 2*a* that have passed through the surface 4 of a thin, interface lamina 3 and into a pressure pad A (which may be made, e.g., from rubber, urethane, wood or soft plastic). The choice of pressure pad material depends on the hardness of the interface lamina 3, the force needed to impale the interface lamina 3 on the barbs 2, and the strength of the barb tips 2*a*.

In FIG. 2, a hard (barb-impenetrable) heading plate B is forced down against the exposed barb tips 2*a* to create rivet- or nail-like heads 2*b* at the end of each barb 2 that forcibly clamp (or lock) the two laminae together.

The material for the interface lamina 3 may be chosen from any thin, pierceable sheet, foil, membrane, paper, board, resin bonded fibre/particle sheet, or the like, whose specification provides a body and a surface suitable for its operational environment. Heat, adhesiveness, pressure, shear, wear, friction, chemical resistance and cost may all be factored into the choice.

Generally the interface surface 4, being the upper surface of the interface lamina 3, is functionally very important, especially if adhesive bonding is used to secure an outer object or layer C (an "attachment") to the hybrid laminate. For example, the interface lamina 3 may be a sheet of abrasive coated paper or abrasive filled resin-reinforced fibre, in which case the interface body offers heat resistant, compressive strength, low cost, and, an interface surface having excellent bonding properties.

As depicted in FIG. 1, a sealant, coating or adhesive layer D' (interrupted dotted line) may be employed between the two laminae. While this is not required to make the instant hybrid laminate, such intermediate layers may provide benefits such as improved strength, sealing, rust prevention and the like.

FIG. 4 shows a perspective view of a laminate product 10 made according to the instant invention. The forward portion has been cut away to show the underlying construction. The exposed barbs 2 on the left rise up from the base lamina 1 and have pointed, piercing tips 2*a*, some of which are shown as having pierced through the interface lamina 3. Headed tips 2*b* are shown in dotted outline beneath the adhesive layer D. These riveted or clinched heads 2*b* bear down onto interface surface 4 of the interface lamina 3 so as to clamp/secure the two laminae together. Attachment C above is bonded onto the interface surface 4 of the interface lamina 3 by the adhesive layer D. Adhesives may include thermoplastic and thermoset resins.

FIG. 5 shows a disc brake pad 20 made according to the instant invention. Two disc-shaped friction pucks C (right) and C' (left, in dashed outline) are shown attached to the interface lamina 3. The friction pucks are pre-manufactured; that is, they are moulded/shaped and cured so they are ready to be adhesively bonded to the hybrid laminate backing plate 30, which comprises a shaped steel base lamina 1' and a shaped interface lamina 3' whose interface surface 4 receives the adhesive D (shown having oozed out from beneath the friction pad C).

FIG. 6 shows the same brake pad 20 as shown in FIG. 5, but with the interface lamina 3' in two pieces to match two spaced patches of barbs 2 on the base lamina 1'. Any number of such barbed patches and matching interface lamina portions may be used in accordance with brake pad design requirements. For example, a large backing plate may have barbs arranged in two or more circular patches with space between each patch. In such a case it may be preferable to have a separate interface lamina 3' for each patch of barbs, each configured to receive and attach to one friction puck C.

When designed to be used with two piston calipers (not shown), the friction pucks C, C' may be advantageously positioned directly on axis with the pistons so as to offer maximum resistance to flex and force distribution. More than two smaller friction pucks or one single friction puck are also contemplated.

It can be readily appreciated by those skilled in the art that there will be considerable air flow all around the friction pucks cooling them more quickly for safer braking.

FIG. 7 shows a brake pad employing a preferred embodiment of a hybrid laminate that is particularly well suited for use to make a disc brake pad. The interface lamina 3 is a sheet 30' with a layer of adhesively-bound grains 3' evenly dispersed thereon to form what is commonly referred to as a coated abrasive. The construction therefore resembles ordinary waterproof sandpaper such as that used for wet sanding auto body paint. Such an interface lamina can be said to have an internal reinforcement, or be a "virtual solid" in that it comprises high-strength, tightly packed solid grains embedded in a tough, waterproof adhesive and distributed to a precise thickness on a tough sheet material such as impregnated papers, resin reinforced fibres and cloths, vulcanized fiber, plastic films, phenolic sheet and the like on a tough sheet backing material.

Grains are accurately sorted by size. They can be sand, aluminum oxide, silicon carbide, garnet, emery and the like. Sand is likely the best (cheap, strong) for the brake application.

The backing has adhesive applied onto which the gains are laid by gravity or electrostatic means and a sizing/coating applied. Then the sheet is baked dry and rolled for shipment.

Waterproof adhesives include water based phenolic and urea resins.

Examples of pierceable material include: paper, fibreglass, mica, cloth, coated abrasives, vulcanized fiber, plastic films, and combinations thereof.

The result is an easily pierceable interface layer 3 with remarkable properties. These include: high compression strength, heat resistance, low thermal conductivity, and low cost. In addition, because the grains are packed tightly they bear against each other and against the barbs that have penetrated therethrough. The result is an interface layer offering enormous shear strength (important for safe braking) because the high shear loads that develop on the friction puck C (from the brake rotor) are effectively transmitted to the base lamina 1 via multiple paths through packed grains 3' to barbs 2 and into base lamina 1. In this way there is no weak shear plane through the interface lamina 3 as would be the case with a homogeneous interface lamina material without the internal reinforcement provided by the packed grains.

The forgoing disclosure as it relates to brake pads can facilitate a continuous brake pad manufacturing process that offers significant advantages of cost and speed of production compared to the currently used "batch" process.

With the instant invention, pucks in a standard set of sizes (e.g., small, medium and large) and shapes can be optimally positioned on any size backing plate—fewer pucks on smaller plates for lighter vehicles and more on larger plates for faster and/or heavier vehicles. Thus the need for, e.g., hundreds of moulds and heated presses is eliminated. Modern adhesives cure at room temperature and no continuous pressing is required.

In addition, the instant hybrid backing plate offers the opportunity to mix the friction formulations of the pucks or to add a thin tell-tale pad whose ablated powder can be detected about the wheels of the vehicle thereby indicating when brakes need replacing.

While the foregoing description has focused on the use of the new hybrid laminate for making hybrid laminate disc brake backing plates to which can be adhered pre-made cured pucks of friction material to form disc brake pads, the use of the hybrid laminate is not limited to brake backing plates. A hybrid laminate made according to the invention may be advantageously employed in any situation where one wishes to adhesively adhere material to a metal, such as steel (or other ductile material), lamina where the material (an "attachment") does not adhere well to metal by directly attaching it to the metal lamina using adhesive. Instead the material can be adhered to an interface lamina locked to the steel lamina by clinched barbs, as described above, where the interface lamina material is selected to be a material that is pierceable by the piercing members and which is well suited for adhesive bonding to the material of the attachment.

It should be understood that the above-described embodiments of the present invention, particularly, any "preferred" embodiments, are only examples of implementations, merely set forth for a clear understanding of the principles of the invention. Many variations and modifications may be made to the above-described embodiment(s) of the invention as will be evident to those skilled in the art. That is, persons skilled in the art will appreciate and understand that such modifications and variations are, or will be, possible to utilize and carry out the teachings of the invention described herein.

Where, in this document, a list of one or more items is prefaced by the expression "such as" or "including", is followed by the abbreviation "etc.", or is prefaced or followed by the expression "for example", or "e.g.", this is done to expressly convey and emphasize that the list is not exhaustive, irrespective of the length of the list. The absence of such an expression, or another similar expression, is in no way intended to imply that a list is exhaustive. Unless otherwise expressly stated or clearly implied, such lists shall be read to include all comparable or equivalent variations of the listed item(s), and alternatives to the item(s), in the list that a skilled person would understand would be suitable for the purpose that the one or more items are listed.

The words "comprises" and "comprising", when used in this specification and the claims, are to used to specify the presence of stated features, elements, integers, steps or components, and do not preclude, nor imply the necessity for, the presence or addition of one or more other features, elements, integers, steps, components or groups thereof.

The scope of the claims that follow is not limited by the embodiments set forth in the description. The claims should be given the broadest purposive construction consistent with the description and figures as a whole.

The invention claimed is:

1. A hybrid laminate disc brake backing plate comprising a base lamina and an interface lamina thinner than the base lamina, the base lamina comprising a metal plate having a surface with piercing members extending therefrom, each piercing member having a distal end spaced from the surface, wherein the interface lamina is impaled on the piercing members so that the piercing members extend through and protrude from the interface lamina, and the distal ends of the piercing members are clinched to lock the base lamina and interface lamina together, the interface lamina comprising a sheet that is at least one of abrasive-filled and abrasive coated and being adhesively bondable to cured friction material.

2. The hybrid laminate disc brake backing plate of claim 1, wherein the base lamina is made of steel.

3. The hybrid laminate disc brake backing plate of claim 1, wherein the surface of the base lamina has a plurality of patches of piercing members, and the interface lamina comprises a plurality of separate portions, each portion corresponding to a respective one of the patches of piercing members, wherein each portion of the interface lamina is impaled on one of the patches of piercing members.

4. The hybrid laminate disc brake backing plate of claim 3, wherein the patches of piercing members are spaced apart to permit air flow between friction pucks comprising cured friction material bonded to the interface lamina.

5. The hybrid laminate disc brake backing plate of claim 1, wherein the interface lamina is made of abrasive filled resin-reinforced fibre.

6. The hybrid laminate disc brake backing plate of claim 1, wherein the interface lamina is a coated abrasive comprising a layer of adhesively-bound grains dispersed on the sheet.

7. The hybrid laminate disc brake backing plate of claim 6, wherein the grains comprise sand, aluminum oxide, silicon carbide, garnet, or emery.

8. A disc brake pad comprising:
 a hybrid laminate disc brake backing plate comprising a base lamina and an interface lamina, the base lamina comprising a metal plate having a surface with piercing members extending therefrom and having clinched heads, wherein the piercing members pass through the interface lamina, and the clinched heads lock the base lamina and interface lamina together; and a cured friction material bonded to the interface lamina; wherein the interface lamina is thinner than the base lamina and thinner than the cured friction material.

9. The disc brake pad of claim 8, wherein the base lamina is made of steel.

10. The disc brake pad of claim 8, wherein the surface of the base lamina has a plurality of patches of piercing members, and the interface lamina comprises a plurality of separate portions, each portion corresponding to a respective one of the patches of piercing members, wherein each portion of the interface lamina is impaled on the respective ones of the patches of piercing members.

11. The disc brake pad of claim 10, wherein the cured friction material is provided as a plurality of pucks, and each puck is bonded to a respective one of the portions of the interface lamina.

12. The disc brake pad of claim 8, wherein a functional material different from the materials used to form the base lamina and the interface lamina is disposed between the base lamina and the interface lamina.

13. The disc brake pad of claim 12, wherein the functional material is a sealant.

14. The disc brake pad of claim 8, wherein the cured friction material is adhesively bonded to the interface lamina by a thermoplastic or thermoset resin.

15. The disc brake pad of claim 8, wherein the interface lamina is made of abrasive filled resin-reinforced fiber.

16. The disc brake pad of claim 8, wherein the interface lamina is a coated abrasive comprising a sheet with a layer of adhesively-bound grains dispersed thereon.

* * * * *